Nov. 15, 1949    J. BOWMAN ET AL    2,488,165
METHOD OF PROCESSING MEAT PRODUCTS
Filed March 4, 1946    2 Sheets-Sheet 1
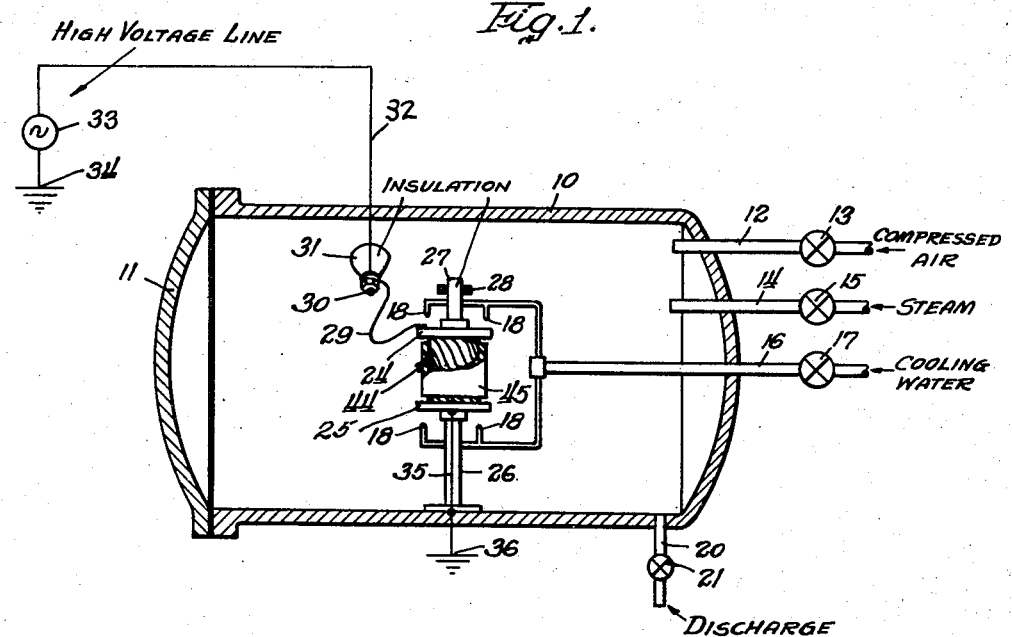
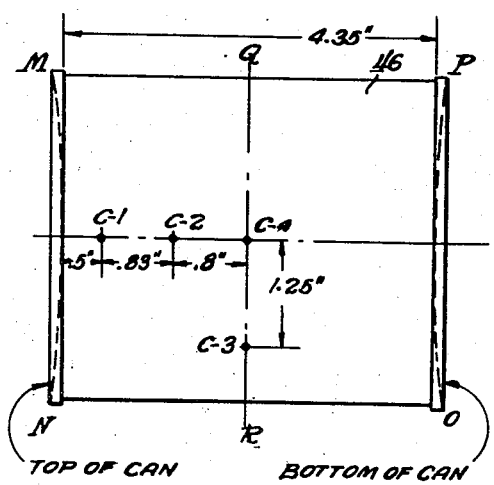
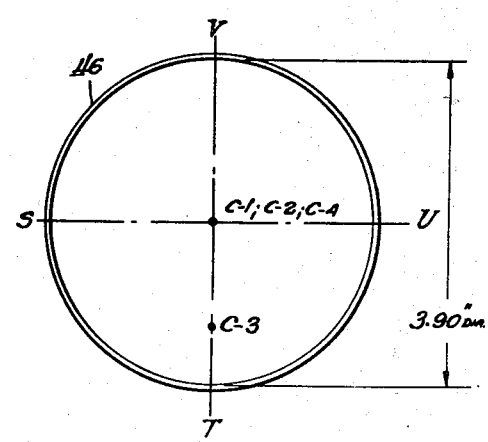
Inventors:
Jay Bowman,
Buell W. Beadle.
By Brown Jackson Boutche Dresser
Attys.

Nov. 15, 1949  J. BOWMAN ET AL  2,488,165
METHOD OF PROCESSING MEAT PRODUCTS
Filed March 4, 1946  2 Sheets-Sheet 2
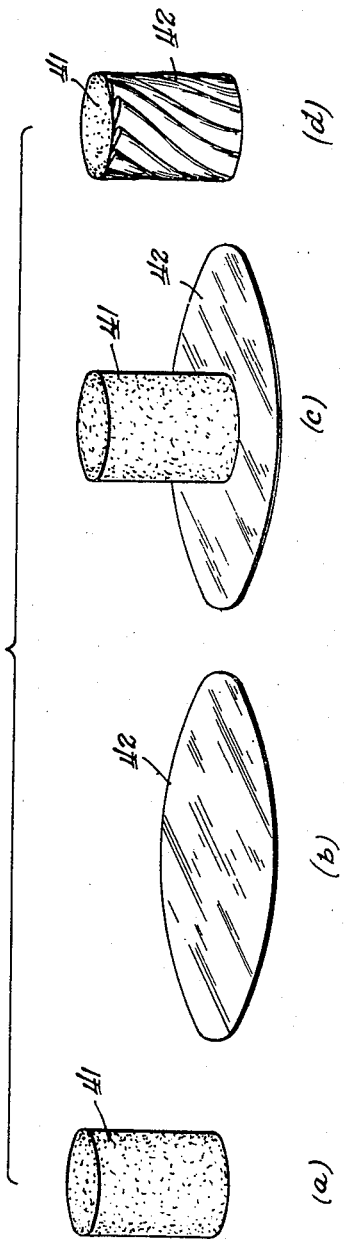
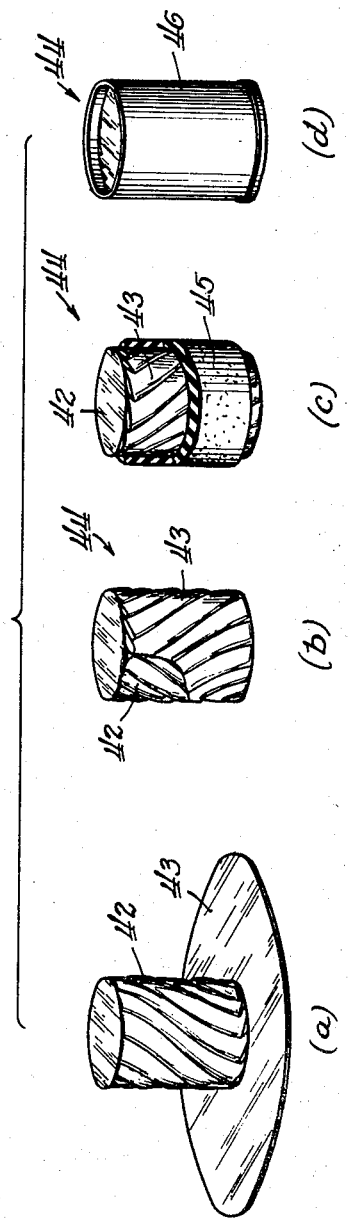
Inventors
Jay Bowman,
Buell W. Beadle.
By
Attys.

Patented Nov. 15, 1949

2,488,165

UNITED STATES PATENT OFFICE 2,488,165

METHOD OF PROCESSING MEAT PRODUCTS

Jay Bowman and Buell W. Beadle, Chicago, Ill., assignors to A. W. Brickman, Victor Conquest, Frank J. Madden, Wrisley B. Oleson, and Emery T. Filbey, all of Chicago, Ill., as trustees for American Meat Institute Foundation, Chicago, Ill., a corporation of Illinois Application March 4, 1946, Serial No. 651,914

2 Claims. (Cl. 99—107)

1

This invention relates, generally, to the processing of meat products, and it has particular relation to the processing or cooking the same in connection with packaging thereof in sealed containers.

As set forth in the copending application Serial No. 651,569, filed March 2, 1946, of Jay Bowman, one of the present joint inventors, a serious difficulty encountered in the processing of packaged meat products, is the inability of uniformly processing the contents of a can throughout. It has been the practice to vacuum pack raw meat products in a can, and then to apply external heat and pressure to the can in order to process the contents. When sufficient external heat is thus applied to rapidly process the outer portion of the meat products in the can, it has been found that the central portion thereof is not sufficiently or properly processed. Now when sufficient heat is applied to properly process the central portion, the outer portion is over treated.

One manner in which this problem is solved is set forth in the copending application above referred to. The raw meat products are formed into a cylindrical mass and are positioned in a glass applicator comprising a hollow glass cylinder. Metallic electrodes are placed at the ends of the glass cylinder and in contact with the meat products therein. A high frequency electric potential is then applied between the electrodes. The frequency of the current source may be of the order of 10 megacycles and a voltage of about 4200 volts may be used. As the result of the application of the high frequency potential, the central part of the mass of meat products is raised to processing temperatures. However, the characteristics of the arrangements are such that this heat treatment is predominant in the central portions of the meat products, the outer portions receiving relatively little processing. During the application of high frequency potential, external pressure is applied to the container to minimize loss of meat juices resulting from the high temperatures at the central portion.

After the central portion has been sufficiently processed, external heat is applied, as by the application of steam, to process the outer portion of the meat products. Because of the heat insulation provided by the meat products, the externally applied heat is effective principally for processing the outside portion. By properly correlating the application of heat resulting from the high frequency and the externally applied heat, it is possible to process the central and outer portions of the meat products substantially uniformly.

It is an object of the present invention to provide for more uniformly processing the entire mass or block of meat products through the use of high frequency current and the application of external heat.

Another object is to provide a more simple and efficient method of processing the products.

Still another object is to confine the meat products to be processed in such manner as to facilitate substantially uniform treatment thereof throughout the entire mass while allowing for expansion and contraction thereof.

A further object of the invention is to wrap a formed body of meat products so as to readily permit the application of high frequency current thereto and subsequent sealing in a can and further external heat treatment thereof.

Another object of the invention is the utilization of certain unique properties of parchment paper as will appear hereinafter.

Other objects and advantages of the invention will, in part, be obvious and in part appear hereinafter.

In accordance with the present invention the meat products to be heat treated are formed into generally cylindrical block or masses in the raw state. It will be understood that suitable seasoning, etc., is mixed in with the raw meat products. The block of meat products is first wrapped in parchment paper. The wrapped block is then positioned inside of a ring or tube of insulation, such as fiber. This tube or ring of fiber not only provides mechanical support for the wrapped block of meat products, but also, in conjunction with the parchment paper, provides suitable electrical insulation between the ends of the block.

The wrapped block thus assembled in the sleeve of insulation is placed in an upright position between a pair of disc-shaped electrodes which are mounted within a retort or other suitable pressure vessel. A high frequency potential is then applied between the electrodes so as to heat the central portion of the meat products sufficiently, taking into consideration the processing occurring during sequent cooling, to adequately process the same. At the same time that the high frequency potential is being applied, external pressure, such as air pressure, is applied to the meat products in order to minimize the escape of meat juices which would otherwise be freely expelled due to the heat thus applied.

After the central portion of the meat products has been sufficiently heated to a predetermined desired extent, the energizing potential is removed and cooling water is applied to the electrodes. As will be noted more fully hereinafter, an appreciable amount of processing normally occurs during this sequent cooling operation. The wrapped block of meat products is then removed from the insulating tube, is placed in a can, and vacuum sealed. Thereafter external heat and pressure are applied predominantly to process the outer portion of the meat products in the can which was not sufficiently processed by the application of high frequency potential.

Now in order to acquaint those skilled in the art to which the invention pertains how to practice the present invention, there is described herein, in connection with the accompanying drawings a specific embodiment of the same.

In the drawings:

Figure 1 is a view, partly in section and partly diagrammatic, illustrating how the high frequency electrical potential can be applied for processing the central portion of the block of meat products;

Figures 2 and 3 are, respectively, side and end elevations of a can or meat products arranged to be treated in accordance with the present invention and illustrating the points at which temperature readings were taken to demonstrate the operating characteristics of the invention;

Figure 4 shows different steps that may be used in wrapping the block of meat products; and Figure 5 shows additional steps which can be used in wrapping the block of meat products and further processing of the same.

Referring now particularly to Figure 1 of the drawings, it will be observed that the reference character 10 designates a retort or pressure vessel having a suitable door or cover 11. It will be understood that conventional means is provided for clamping the door 11 shut and sealing the same against internal pressure which is developed within the retort 10. Suitable controls are provided for maintaining desired pressures and temperatures within the retort 10. Compressed air may be supplied through conduit 12 under the control of a valve 13. Likewise, steam may be introduced through a conduit 14 under the control of a valve 15. Cooling water can be supplied through a conduit 16 in which there is located a control valve 17. Nozzles 18, fed from the conduit 16, serve to direct the sprays of water onto the electrodes for cooling the same and the block of meat products therebetween as will be set forth in more detail hereinafter. A drain is provided by a conduit 20 having a valve 21 therein.

There is provided within the retort 10 a pair of plate-like metallic electrodes 24 and 25 which, as shown, are positioned parallel to one another in generally horizontal planes, and one is located above the other. The lower electrode 25 is carried by a suitable support 26 extending upwardly from the bottom of the retort 10. The upper electrode 24 is carried by a rod 27 formed of suitable insulating material which, in turn, is carried slidably for free up and down movement in a bracket 28 that is mounted by means (not shown) internally of the retort 10.

It will be understood that it is necessary to insulate only the electrode 24 from ground. The electrode 24 may be connected by a conductor 29 to a terminal 30 which is carried by an insulator 31 that extends through the wall of the retort 10. A high voltage line or conductor 32 serves to connect the terminal 30 to a source 33 of high voltage, high frequency current. This may be a 15 kw. capacity generator capable of generating a frequency of 10 megacycles. Of course it will be understood that different frequencies and different capacities can be used. The generator 33 is grounded as indicated at 34, and the lower electrode 25 is grounded by a conductor 35 connecting it to the retort 10 and to ground as indicated at 36.

Referring now to Figure 4 of the drawings, it will be noted that the reference character 41 designates a cylindrical block of meat. In the particular operation here under consideration the block 41 was formed of vacuum-mixed luncheon meat and was of such size as to fit in a No. 2½ can. This block 41, shown in Figure 4(a), was then placed on a sheet 42 of parchment paper, Figure 4(b), so as to provide the arrangement shown in Figure 4(c). The parchment paper 42 (described in detail hereinafter) is circular in shape, as illustrated, and is wet to facilitate its being wrapped around the block 41 of meat products as shown in Figure 4(d). The upper edge of the paper 42, after being wrapped spirally, was trimmed as shown.

The block of meat thus partially wrapped was then inverted and placed on a second sheet 43 of a similar wet parchment paper as indicated in Figure 5(a). The sheet 43 was then spirally wrapped in an opposite direction around the block of meat, as shown in Figure 5(b) to provide the completely enclosed block, indicated generally at 44 in this figure.

The enclosed block 44 of meat was then placed inside of a fiber ring or tube 45, as shown in Figure 5(c). The tube 45 should be somewhat shorter than the block 44 so that the block projects therefrom on opposite ends, as shown. This arrangement insures that the electrodes 24 and 25 will remain in contact with the ends of the block 44 during the high frequency treatment.

The cylindrical block of meat thus prepared as indicated at 44, enclosed in the sleeve 45, was then placed between the electrodes 24 and 25 as shown in Figure 1 of the drawings. Arrangements were made for measuring the temperatures at points C-1, C-2, C-3 and C-4 located as shown in Figures 2 and 3 of the drawings. Temperature measurements were taken at each point in the block of meat while it was being processed between the electrodes 24 and 25 as indicated in Figure 1, and also at these same points when the block of meat was being processed subsequently in a sealed can 46. It will be understood that a horizontal plane through the axis of the can 46 and the meat therein is indicated by the letters MNOP. The letters STUV in Figure 3 are indicative of the vertical plane through the QR axis of the can 46 and the meat block therein.

Just prior to inserting the block of meat 44 thus prepared between the electrodes 24 and 25 the end portions of the parchment paper wrappers are sprinkled with salt in order to facilitate conduction to the electrodes 24 and 25 through the parchment paper.

The retort 10 was then closed and air pressure of 20 lbs. gauge was applied through the conduit 12 to the retort and to the outside of the paper-wrapped block of meat 44. The electrodes 24 and 25 were energized with high frequency current at 3500 volts, the current flow being about 0.15 ampere. Temperature readings were taken at the points indicated in Figures 2 and 3 of the drawings. In the following table there are set forth the data obtained from this test run:

*High frequency cook*

| Time (minutes) | Standard Positions | | | | Air Press., p. s. i. g. |
|---|---|---|---|---|---|
| | C-1, °F. | C-2, °F. | C-3, °F. | C-4, °F. | |
| 0 HF Power on—3500 volts, 0.15 ampere | | | | | 5 |
| 1 | | | | | 20 |
| 5 | | | 129 | | 20 |
| 6 | | | 144 | | 20 |
| 7 | | | 158 | | 20 |
| 8 | | | 171 | | 20 |
| 9 | | | 189 | 172 | 20 |
| 10 | 190 | 183 | 207 | 189 | 20 |
| 11 | 214 | 198 | 221 | 201 | 20 |
| 12 Power Off | 246 | 214 | 234 | 212 | 28 |
| 13 | 252 | 216 | 234 | 214 | 28 |
| 14 | 253 | 219 | 234 | 216 | 30 |
| 15 | 253 | 221 | 232 | 217 | 30 |
| 16 | 252 | 225 | 228 | 219 | 30 |
| 17 | 248 | 225 | 226 | 220 | 30 |
| 18 | 248 | 225 | 225 | 221 | 30 |
| 19 | 246 | 226 | 223 | 221 | 30 |
| 20 | 243 | 228 | 221 | 221 | 30 |
| 21 | 239 | 232 | 220 | 223 | 30 |
| 22 | 237 | 232 | 219 | 224 | 30 |
| 23 | 235 | 232 | 219 | 224 | 30 |
| 24 | 234 | 232 | 218 | 225 | 30 |
| 25 | 228 | 232 | 217 | 225 | 30 |
| 26 | 226 | 232 | 217 | 225 | 30 |
| 27 | 225 | 232 | 216 | 225 | 30 |
| 28 | 221 | 232 | 216 | 226 | 30 |
| 30 | 217 | 232 | 212 | 226 | 30 |
| 31 Cold water on | | | | | 22 |
| 32 | 212 | 228 | 210 | 226 | |
| 33 | 210 | 228 | 210 | 226 | 22 |
| 34 | 208 | 227 | 209 | 225 | 22 |
| 35 | 207 | 226 | 208 | 225 | 22 |
| 36 | 203 | 225 | 207 | 225 | 20 |
| 37 | 201 | 225 | 207 | 224 | 20 |
| 38 | 198 | 224 | 206 | 223 | 20 |
| 40 | 194 | 223 | 205 | 223 | 20 |
| 41 | 190 | 221 | 203 | 222 | 20 |
| 42 | 189 | 220 | 202 | 221 | 20 |
| 43 | 185 | 219 | 201 | 221 | 20 |
| 45 | 180 | 216 | 199 | 220 | 15 |
| 47 | 176 | 215 | 198 | 218 | 15 |
| 49 | 172 | 212 | 195 | 216 | 15 |
| 51 | 167 | 207 | 194 | 214 | 15 |
| 53 | 164 | 207 | 192 | 212 | 8 |
| 55 | 162 | 205 | 190 | 212 | 8 |
| 57 | | 201 | 189 | 210 | 8 |
| 59 | | 198 | 187 | 207 | 5 |
| 61 | | 196 | 183 | 203 | 0 |
| 63 | | 193 | 181 | 201 | |

Retort opened and container put in refrigerator.

As indicated in the above table, the high frequency current was discontinued after twelve minutes. However the temperature continued to rise for some time except at the outermost position C-3. The air pressure was adjusted upwards to 30 lbs. per square inch. At the end of thirty minutes, the valve 17 was opened and cooling water was sprayed from the nozzles 18 onto the electrodes 24 and 25. The amount of processing occurring during this sequent cooling is coordinated with that occurring during the high frequency treatment. When all points had cooled to below 200° F., the pressure in the retort 10 was reduced to atmospheric pressure. The external air pressure thus applied prevented bulging or tearing of the paper wrappings. There was no leakage except for a slight dripping around some of the thermometers which were used for taking the temperature readings. The meat, with its wrappings 42 and 43, the fiber ring or sleeve 45, and the thermometers undisturbed, was placed in a refrigerator and held for several hours at a temperature of about 35° F. The thermometers and fiber ring 45 were then readily removed without any loss of juice.

The paper-wrapped block of meat 44 was then transferred to a No. 2½ can, such as the can 46 shown in Figure 5(d) of the drawings. Thermocouples were inserted to measure the temperatures at the points C-1, C-2, C-3 and C-4, previously referred to. The can 46 was then vacuum-sealed with about 25 inches of vacuum and was again placed in the retort 10.

After closure of the retort 10, steam pressure of 10 lbs. (corresponding to a retort temperature of about 239° F.) was maintained for 112 minutes. The steam was applied through the conduit 14 and the pressure was maintained by suitable regulating apparatus (not shown). The steam was then shut off and cooling water was applied by opening the valve 17 until the can was well covered. During the time that the cooling water was applied, the steam pressure was replaced by external air pressure through conduit 12 in conventional manner until the temperature within the can fell below 200° F. The retort 10 was then drained and opened. The data in the following table were obtained during the test just described:

*Steam cook*

| Time | Standard Positions | | | | Pressure, p. s. i. g., steam |
|---|---|---|---|---|---|
| | C-1, °F. | C-2, °F. | C-3, °F. | C-4, °F. | |
| Initial Tp.: | | | | | |
| 0 Steam on | 56 | 50 | 55 | 46 | 0 |
| 6 | 88 | 53 | 125 | 49 | 10 |
| 8 | 95 | 54 | 132 | 49 | 10 |
| 9 | 100 | 55 | 136 | 50 | 10 |
| 10 | 104 | 56 | 141 | 50 | 10 |
| 11 | 108 | 57 | 145 | 51 | 10 |
| 12 | 112 | 58 | 150 | 51 | 10 |
| 13 | 116 | 60 | 153 | 51 | 10 |
| 14 | 119 | 61 | 155 | 52 | 10 |
| 15 | 122 | 63 | 158 | 53 | 10 |
| 16 | 126 | 65 | 161 | 54 | 10 |
| 17 | 128 | 67 | 163 | 55 | 10 |
| 18 | 131 | 69 | 166 | 56 | 10 |
| 19 | 135 | 72 | 169 | 58 | 10 |
| 20 | 138 | 74 | 171 | 59 | 10 |
| 21 | 140 | 76 | 173 | 61 | 10 |
| 23 | 145 | 81 | 176 | 61 | 10 |
| 25 | 150 | 87 | 179 | 68 | 10 |
| 26 | 155 | 92 | 181 | 72 | 10 |
| 28 | 160 | 98 | 184 | 76 | 10 |
| 30 | 165 | 105 | 186 | 81 | 10 |
| 32 | 169 | 112 | 188 | 87 | 10 |
| 34 | 172 | 118 | 189 | 93 | 10 |
| 36 | 176 | 123 | 191 | 100 | 10 |
| 38 | 180 | 129 | 193 | 106 | 10 |
| 40 | 183 | 134 | 194 | 111 | 10 |
| 42 | 187 | 140 | 196 | 117 | 10 |
| 44 | 189 | 144 | 197 | 122 | 10 |
| 46 | 192 | 149 | 199 | 127 | 10 |
| 48 | 194 | 153 | 200 | 132 | 10 |
| 50 | 196 | 157 | 201 | 137 | 10 |
| 52 | 198 | 161 | 202 | 141 | 10 |
| 54 | 200 | 165 | 204 | 146 | 10 |
| 56 | 204 | 169 | 205 | 151 | 10 |
| 58 | 204 | 172 | 206 | 155 | 10 |
| 60 | 206 | 175 | 208 | 158 | 10 |
| 62 | 208 | 178 | 209 | 162 | 10 |
| 64 | 209 | 181 | 210 | 166 | 10 |
| 66 | 210 | 184 | 211 | 169 | 10 |
| 68 | 211 | 186 | 212 | 172 | 10 |
| 70 | 213 | 189 | 213 | 175 | 10 |
| 72 | 214 | 191 | 215 | 178 | 10 |
| 74 | 215 | 193 | 216 | 181 | 10 |
| 76 | 216 | 195 | 216 | 183 | 10 |
| 78 | 217 | 197 | 217 | 186 | 10 |
| 80 | 218 | 199 | 218 | 188 | 10 |
| 82 | 219 | 201 | 219 | 191 | 10 |
| 84 | 220 | 202 | 220 | 193 | 10 |
| 86 | 220 | 204 | 220 | 196 | 10 |
| 88 | 221 | 206 | 220 | 198 | 10 |
| 90 | 222 | 207 | 219 | 199 | 10 |
| 92 | 222 | 209 | 218 | 201 | 10 |
| 94 | 223 | 210 | 219 | 203 | 10 |
| 96 | 224 | 211 | 219 | 204 | 10 |
| 100 | 225 | 214 | 221 | 208 | 10 |
| 102 | 225 | 215 | 221 | 209 | 10 |
| 104 | 226 | 216 | 222 | 210 | 10 |
| 106 | 227 | 217 | 222 | 211 | 10 |
| 108 | 227 | 218 | 223 | 213 | 10 |
| 110 | 227 | 219 | 223 | 214 | 10 |

Steam cook—Continued

| Time | Standard Positions | | | | Pressure, p. s. i. g., steam |
|---|---|---|---|---|---|
| | C-1, °F. | C-2, °F. | C-3, °F. | C-4, °F. | |
| 112 Steam Off | | | | | 10 |
| 112½ Water on | | | | | 10 |
| 113 Can completely covered with water | | | | | 10 |
| 114 | 229 | 227 | 221 | 215 | 10 |
| 116 | 219 | 221 | 209 | 217 | 10 |
| 118 | 206 | 221 | 192 | 218 | 10 |
| 120 | 194 | 220 | 182 | 218 | 10 |
| 122 | 185 | 218 | 173 | 217 | 12 |
| 124 | 179 | 215 | 165 | 214 | 10 |
| 126 | 170 | 210 | 158 | 210 | 10 |
| 128 | 164 | 206 | 153 | 207 | 10 |
| 130 | 158 | 200 | 146 | 202 | 6 |
| 132 | 153 | 197 | 142 | 199 | |
| 133 Retort opened | | | | | 0 |

By coordinating the sterilization effect of the high frequency treatment of the central portion of the block of meat 41, including that portion of the processing occurring during the sequent cooling, with the sterilization effect of the steam treatment on the outer portion of the block 41, likewise including that portion of the processing occurring during the sequent cooling, it is practical to approximately uniformly process or cook the block 41 throughout.

As indicated above, parchment paper has unique properties in comparison with other types of paper and similar sheet material, which make it particularly useful in connection with the invention. It appears that nearly all commercial grades of parchment paper are useful in this connection. One particular grade of commercial parchment paper which serves very satisfactorily is that furnished under the trade name of "Patapar" by the Kalmazoo Vegetable Parchment Paper Co. and more fully identified in the trade as "35 pound lard liner parchment paper." Vegetable parchment paper is conventionally made by treating a cellulosic paper sheet with sulfuric acid, followed by rinsing. As in the case of "Patapar" referred to above, it is customary to soften or plasticize the parchment paper by the addition thereto of small amounts of glycerine or similar plasticizer.

Parchment paper has considerable strength, even when wet with meat juices and particularly when used with a support as in the invention. It is relatively non-permeable to the juices and does not disintegrate at the relatively high processing temperatures. The parchment paper around the side walls of a block of meat (see Figures 4 and 5) is practically electrically non-conducting, and even when wet with meat juices, offers no better electrical path than the surface of the meat itself. In this sense, the parchment paper may be said to provide an electrically non-conducting envelope for the blocks of meat. However, there appear to be small pores extending through the parchment paper which, under the influence of an electrical field and when wet with a salt solution, make that section of the paper permeable to the passage of electrical current. Referring to Figures 4 and 5, the portions of the parchment paper envelope for the meat block 41, which lie over the opposite ends thereof, thus permit substantial high frequency current to pass through the central portion of the meat block 41 when disposed between the electrodes 24 and 25 as shown in Figure 1, without tendency to arc or burn.

Furthermore, a parchment paper envelope for a block of meat permits expansion and contraction of the meat without permitting the meat juices to leak out. This feature is very important from a practical standpoint since it allows the high frequency treatment of this invention to be applied with apparatus that is mechanically very simple. Thus, as shown in Figure 1, the encased block of meat 44 is supported on a bottom electrode 25, while the movable upper electrode 24 rests on the top end of the block in contact with the wet parchment paper. Any other arrangement would be considerably more complicated.

While specific frequencies, currents and voltages have been specified as having been used together with certain air and steam temperatures and pressures, it will be understood that other values of these factors can be used and that the mention herein of specific values is by way of illustration only. What is important is to so correlate the heat treatment resulting from the application of the high frequency electric field to the heat treatment provided by the application of external heat so as to have a substantially equivalent total heat effect at every point throughout the meat block, which will result in uniform processing of the entire mass.

Accordingly, it is intended that all matter shown in the accompanying drawings and described hereinbefore shall be interpreted as illustrative and not in a limiting sense.

What is claimed as new is:

1. Method of processing meat products which comprises, forming the meat into a body of substantially predetermined size, wrapping the body with parchment paper, placing the wrapped body in an open-ended insulating container and between a pair of electrodes, applying high frequency electric potential between said electrodes to develop processing temperatures throughout the central part of the body, cooling the body, removing the wrapped body from the container and sealing the same in a can, and applying external heat to the can sufficient to develop processing temperatures in the outer part of the body and cooling the container and contents, the amount of processing of said central part, including both that occurring during application of said high frequency electric potential and that occurring during sequent cooling, and the amount of processing of said outer part, including both that occurring during the application of external heat and that occurring during the sequent cooling of said container and contents, being sufficient to uniformly process said meat body throughout.

2. Method of processing meat products which comprises, forming the meat into a body of substantially predetermined size, wrapping the body with parchment paper, placing the wrapped body in an open-ended insulating container and between a pair of electrodes, applying high frequency electric potential between said electrodes to develop processing temperatures throughout the central part of the body and simultaneously applying external fluid pressure to the container to minimize the loss of meat juices by exudation therefrom, maintaining for a predetermined time the inner portions of the body at temperatures high enough to effect the principal part of the processing of said inner portions, cooling the body, removing the wrapped body from the container and sealing the same in a can, and applying external heat to the can sufficient to develop processing temperatures in the outer portions of the body to effect the principal part of the processing thereof, and cooling the container and contents, the respective total amounts of processing at each point of said inner and outer portions, including that occurring during the cooling thereof, being sufficient to process said block substantially uniformly throughout.

JAY BOWMAN.
BUELL W. BEADLE.

REFERENCES CITED

The following references are of record in the file of this patent:

UNITED STATES PATENTS

| Number | Name | Date |
|---|---|---|
| 477,844 | Laubheimer et al. | June 28, 1892 |
| 1,190,010 | Reubold | July 4, 1916 |
| 1,900,573 | McArthur | Mar. 7, 1933 |
| 1,961,681 | Bohart | June 5, 1934 |
| 2,054,756 | Kremer | Sept. 15, 1936 |
| 2,091,263 | Ball | Aug. 31, 1937 |
| 2,305,480 | Komarik | Dec. 15, 1942 |
| 2,364,049 | Bensel | Dec. 5, 1944 |
| 2,387,221 | Williams et al. | Oct. 16, 1945 |
| 2,398,082 | Cavallito | Apr. 9, 1946 |